Patented Oct. 17, 1939

2,176,055

UNITED STATES PATENT OFFICE 2,176,055

SEPARATION OF ALLYL ALCOHOL FROM WOOD SPIRITS RESIDUE

Edgar C. Britton and Gerald H. Coleman, Midland, Mich., assignors to The Dow Chemical Company, Midland, Mich., a corporation of Michigan No Drawing. Application February 11, 1937, Serial No. 125,270

6 Claims. (Cl. 260—640)

This invention relates to a method for recovering allyl alcohol from wood spirits residue.

In the usual process for making wood alcohol there is obtained from the distillation of crude methanol a residue containing 5–40 per cent by weight of allyl alcohol and in addition water, unrecovered methanol, n-propanol, n-amyl alcohol, acetone, and various other compounds. Such residue is commonly known, and herein referred to as "wood spirits residue". Due to the fact that n-propanol and certain other substances present in such residue tend to distill along with allyl alcohol, it is impossible to separate the latter from wood spirits residue by fractional distillation.

We have discovered that wood spirits residue may be treated with hydrogen chloride in such way that the allyl alcohol is selectively attacked and converted to allyl chloride, which may readily be removed from the otherwise unchanged wood spirits residue. We have also found that the allyl chloride may be hydrolyzed to regenerate the allyl alcohol, so that by such chemical treatment the allyl alcohol in the original residue may be recovered in good yield and pure form. The reactions involved may be represented by the following equations:

(1) $CH_2=CH-CH_2OH + HCl \rightarrow$
$CH_2=CH-CH_2Cl + H_2O$ (2) $CH_2=CH-CH_2Cl + H_2O \rightarrow$
$CH_2=CH-CH_2OH + HCl$ The invention, then consists in the method hereinafter fully described and particularly pointed out in the claims.

The preferential reaction between hydrogen chloride and the allyl alcohol in the presence of the other constituents in wood spirits residue proceeds satisfactorily in the absence of a catalyst. However, to shorten the time required, improve the yield of allyl chloride, and minimize formation of by-products, it is advantageous to employ a catalyst, such as a copper-containing salt, e. g. cuprous chloride, cupric chloride, cupric sulfate, cupric nitrate or mixtures of same.

The reaction between hydrogen chloride and the allyl alcohol present in wood spirits residue may be carried out in various ways. According to one procedure, gaseous or aqueous hydrogen chloride is added to wood spirits residue at or slightly below room temperature. The mixture is allowed to stand until an oil layer separates; this layer is removed and the allyl chloride distilled therefrom. The entire mixture of wood spirits residue and hydrogen chloride may also be heated gradually to 55°–75° C. to distill the allyl chloride therefrom. The removal of allyl chloride during such heating may be facilitated by adding slowly a high-boiling acid, e. g. sulfuric acid, to the mixture. According to another procedure, wood spirits residue is maintained at or below the temperature at which the said residue refluxes, preferably at about 75° C., and gaseous or aqueous hydrogen chloride added, whereby the allyl chloride distills from the mixture as it is formed. The crude allyl chloride produced by any of the above procedures may be rendered 90–100 per cent pure by a single redistillation.

Hydrolysis of the allyl chloride to allyl alcohol may be carried out by heating the allyl chloride with 10–30 times its weight of water, preferably in the presence of an alkaline catalyst, e. g. 0.5–1.0 chemical equivalent of sodium hydroxide, lime, or sodium carbonate, etc., per mol of allyl chloride. In the presence of such alkaline catalyst the reaction may be carried out at atmospheric pressure and at temperatures between 40° and 70° C. in 20–40 hours; but in order to reduce the time required it is preferable to heat the hydrolysis mixture in a suitable closed vessel under super-atmospheric pressure at 100°–150° C. for 3–15 hours. In addition to allyl alcohol, some diallyl ether may be formed by the hydrolysis. The aqueous hydrolysis mixture may be distilled, the allyl alcohol usually coming over as a mixture with water and diallyl ether. This mixture may be dried, e. g. with potassium carbonate, and the allyl alcohol separated from diallyl ether by redistillation.

The following examples are illustrative, but are not to be construed as limiting the invention:

Example 1

5.0 g. of cupric chloride was dissolved in 880 g. of wood spirits residue (containing approximately 31 per cent by weight of allyl alcohol), the solution heated to 55°–65° C., and 340 g. of gaseous hydrogen chloride passed in slowly. Allyl chloride distilled from the mixture as it was formed. When addition of hydrogen chloride was completed, the reaction mixture was heated to 75° C. in order to distill any remaining allyl chloride. The crude allyl chloride distillate was washed with water, dried over anhydrous magnesium sulfate, and then fractionally distilled. 312 g. of 95 per cent allyl chloride was obtained.

Example 2

A mixture of 240 lbs. of wood spirits residue (31 per cent allyl alcohol), 375 lbs. of 34 per cent concentrated aqueous hydrochloric acid, and 1.12 lbs. of cupric chloride was warmed to 40° C., whereupon 114 lbs. of crude allyl chloride was distilled from said mixture at a rate of about 12 lbs. per hour. The distillate was washed with water, dried by passing through a bottle filled with flake calcium chloride, and fractionally distilled. 78.5 lbs. of 92.6 per cent allyl chloride was obtained.

Example 3

A mixture of 44 g. of wood spirits residue (31 per cent allyl alcohol), 75 cc. of hydrochloric acid (sp. gr. 1.19), and 1.0 g. cuprous chloride was slowly heated to 75° C. During heating of the mixture, 24.0 g. of concentrated $H_2SO_4$ was added gradually and allyl chloride was permitted to distill as it was formed. The crude allyl chloride product was redistilled, whereby 15.8 g. of 95 per cent allylchloride was obtained.

Example 4

A mixture of 5.82 mols of allyl chloride, 3.06 mols of calcium hydroxide and 123 mols of water was heated in a bomb at a temperature of approximately 110° C. for 4 hours. After such heating allyl alcohol, diallyl ether and some water were distilled from the mixture. This distillate was dried with potassium carbonate and fractionally distilled, whereby 4.85 mols of allyl alcohol and 0.23 mol of diallyl ether were separated as substantially pure compounds.

Example 5

0.5 mol of allyl chloride, 0.5 mol of sodium hydroxide and 13.9 mols of water were heated for 20 hours at 40° C.–80° C. in a flask fitted with a reflux condenser. After such heating allyl alcohol, diallyl ether, and water were distilled from the reaction mixture. 0.42 mol of allyl alcohol was recovered.

To summarize, our method for producing allyl alcohol from wood spirits residue comprises treating said residue with hydrogen chloride preferentially to form allyl chloride, recovering such allyl chloride from the otherwise unchanged wood spirits residue, hydrolyzing the allyl chloride to obtain allyl alcohol, and recovering the latter in substantially pure form.

Other modes of applying the principle of our invention may be employed instead of the one explained, change being made as regards the method herein disclosed, provided the step or steps stated by any of the following claims or the equivalent of such stated step or steps be employed.

We, therefore, particularly point out and distinctly claim as our invention:

1. The method of recovering allyl alcohol from wood spirits residue which comprises treating the latter with hydrogen chloride at a temperature not above the boiling point of the residue, whereby the allyl alcohol present in said residue is preferentially reacted upon forming allyl chloride as substantially the only aliphatic chloride product, separating the allyl chloride and hydrolyzing the same to allyl alcohol.

2. The method of recovering allyl alcohol from wood spirits residue which comprises treating the latter with hydrogen chloride at a temperature below 75° C., whereby the allyl alcohol present in said residue is preferentially reacted upon forming allyl chloride as substantially the only aliphatic chloride product, distilling the resulting mixture to separate the allyl chloride therefrom, and heating the latter with an aqueous alkali solution to form allyl alcohol.

3. The method which comprises treating wood spirits residue with hydrogen chloride at a temperature not above the boiling point of the residue, whereby the allyl alcohol present in said residue is preferentially reacted upon forming allyl chloride as substantially the only aliphatic chloride product, and separating the allyl chloride.

4. The method which comprises treating wood spirits residue with hydrogen chloride at a temperature below 75° C. in the presence of a catalyst essentially comprising copper, whereby the allyl alcohol present in said residue is preferentially reacted upon forming allyl chloride as substantially the only aliphatic chloride product, and separating the allyl chloride.

5. The method which comprises treating wood spirits residue with hydrogen chloride at a temperature below 75° C., whereby the allyl alcohol present in said residue is preferentially reacted upon forming allyl chloride as substantially the only aliphatic chloride product, and distilling the resulting mixture to separate the allyl chloride.

6. The method which comprises heating wood spirits residue at a temperature not above its boiling point and passing gaseous hydrogen chloride into the heated residue, whereby the allyl alcohol present in said residue is preferentially reacted upon forming allyl chloride as substantially the only aliphatic chloride product, and distilling the allyl chloride from the mixture as it is formed.

EDGAR C. BRITTON.
GERALD H. COLEMAN.